United States Patent
Eom et al.

(10) Patent No.: US 8,169,376 B2
(45) Date of Patent: May 1, 2012

(54) BASE STATION TRANSMITTING AND RECEIVING ANTENNA AND CONTROL METHOD THEREOF

(75) Inventors: Soon Young Eom, Daejeon (KR); Moon Man Hur, Seoul (KR); Young Bae Jung, Daejeon (KR); Soon Ik Jeon, Daejeon (KR); Ic Pyo Hong, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 1006 days.

(21) Appl. No.: 12/130,859

(22) Filed: May 30, 2008

(65) Prior Publication Data

US 2009/0061921 A1 Mar. 5, 2009

(30) Foreign Application Priority Data

Aug. 28, 2007 (KR) .................. 10-2007-0086467

(51) Int. Cl.
*H01Q 3/00* (2006.01)
(52) U.S. Cl. .............. 343/757; 455/562.1; 455/522
(58) Field of Classification Search ............ 343/757, 343/765; 455/522, 562.1; 370/328, 335
See application file for complete search history.

(56) References Cited

U.S. PATENT DOCUMENTS

| | | | |
|---|---|---|---|
| 6,188,913 B1 | 2/2001 | Fukagawa et al. | |
| 6,301,238 B1 * | 10/2001 | Hagerman et al. | 370/336 |
| 7,746,289 B2 * | 6/2010 | Gupta | 343/853 |
| 8,055,303 B2 * | 11/2011 | Wild | 455/562.1 |
| 2002/0034943 A1 | 3/2002 | Pallonen | |
| 2009/0296663 A1 * | 12/2009 | Wild | 370/335 |
| 2010/0165914 A1 * | 7/2010 | Cho et al. | 370/328 |

FOREIGN PATENT DOCUMENTS

| | | |
|---|---|---|
| JP | 10-070502 A | 3/1998 |
| KR | 2002-0041554 A | 6/2002 |
| KR | 1020050064401 | 6/2005 |
| KR | 2006-0096692 A | 9/2006 |
| WO | WO-2005/062419 A1 | 7/2005 |

OTHER PUBLICATIONS

Kang et al., Feasibility Study on Beam-Forming Technique with 1-D Mechanical Beam Steering Antenna Using Niching Genetic Algorithm, IEEE Microwave and Wireless Components Letters, vol. 12, No. 12, Dec. 2002, pp. 494-496.

* cited by examiner

*Primary Examiner* — Tan Ho
(74) *Attorney, Agent, or Firm* — Rabin & Berdo, P.C.

(57) ABSTRACT

The present invention relates to base station transmitting and receiving antennas and control methods thereof. For this purpose, the present invention provides a control method of a base station transmitting antenna. The control method includes collecting positional information and transmission level values of all terminals in a cell; analyzing statistics of cell traffic using the positional information and transmission level values, and generating antenna radiation patterns on the basis of the analyzed statistics result; optimizing the antenna radiation patterns by synthesizing beam patterns; and changing antenna beam patterns according to the optimized antenna radiation patterns. According to embodiments of the present invention, it is possible to increase a channel capacity in a cell, ensure the QoS in all terminals in the cell, and reduce installation and operation costs of a base station system.

8 Claims, 13 Drawing Sheets

Cell Region

Cell Region

BASE STATION TRANSMITTING AND RECEIVING ANTENNA AND CONTROL METHOD THEREOF

CROSS-REFERENCE TO RELATED APPLICATION

This application claims priority to and the benefit of Korean Patent Application No. 10-2007-0086467 filed in the Korean Intellectual Property Office on Aug. 28, 2007, the entire contents of which are incorporated herein by reference.

BACKGROUND OF THE INVENTION (a) Field of the Invention

The present invention relates to a base station transmitting and receiving antenna and a control method thereof. Particularly, the present invention relates to base station transmitting and receiving antennas and control methods thereof that are capable of reducing installation and operation costs of a base station system.

The present invention was supported by the IT R&D program of MIC/IITA [2007-F-041-01, Intelligent Antenna Technology Development].

(b) Description of the Related Art

Base stations provide voice and data services to terminals located in allocated cell regions.

Power control of the base stations is an important element, which is needed to maximally set the amount of transmitted and received data as well as a level of a service quality with terminals. For power control, a code division multiple access (CDMA) technology has mainly been used in recent years. The CDMA technology uses an active power control method that performs forward and backward link power control on the basis of open-loop power control and closed-loop power control.

The active power control method performs a control operation such that a sum between power of a base station received from terminals and power transmitted from the base station to the terminals is maintained at a predetermined value, which will be described below with reference to FIGS. 1 and 2.

FIG. 1 is a schematic diagram illustrating a basic principle of power control of a base station using an active power control method.

As shown in FIG. 1, since a terminal A is located closer to a base station than a terminal B, the intensity of a signal that the base station receives from the terminal A is stronger than the intensity of a signal that the base station receives from the terminal B. At this time, the base station uses the active power control method to perform a control operation such that the intensity of a signal transmitted to the terminal B is stronger than the intensity of a signal transmitted to the terminal A, thereby allowing transmitted/received power between the base station and the terminal A to be the same as transmitted/received power between the base station and the terminal B.

FIG. 2 is a diagram illustrating an example of active power control that allows a sum between power transmitted from a terminal to a base station and power of the terminal received from the base station to be maintained at a predetermined value. For reference, in FIG. 2, $P_{MS}$ indicates transmission power that a terminal transmits to a base station, and $P_{BS}$ indicates reception power that the terminal receives from the base station.

As shown in FIG. 2, a sum between transmission power transmitted from a terminal to a base station and reception power of the terminal received from the base station is maintained at a value of −75 dBm. At this time, since the value of −75 dBm is only exemplary, the sum between the transmission power of the terminal and the reception power of the terminal may be set to be maintained at different values.

The power control of the base station using the active power control method that is shown in FIGS. 1 and 2 is applied to narrowband services, such as cellular services and personal communication services (PCS), and is effective in constantly maintaining a quality of service (hereinafter simply referred to as "QoS") of voice and data between a base station and terminals.

Meanwhile, in the active power control method, when the terminals are located at a shadow region or an edge of a cell region or in a null region of a base station antenna radiation pattern, a large amount of power is required for signal transmission and reception between the base station and the terminals in order to maintain the QoS. A signal that is transmitted and received with a large amount of power increases interference noise in other terminals around a corresponding terminal to deteriorate the QoS, which results in compulsorily limiting signal transmission and reception with the terminals requiring a large amount of power.

In recent years, with the development of mobile communication technology, wideband services, such as a wideband code division multiple access (WCDMA), a high speed downlink packet access (HSDPA), and the wireless broadband Internet (Wibro), which provide moving picture data and voice services, have been provided. However, it is difficult to provide uniform QoS for wideband services to all terminals located in a base station cell, using only the active power control method.

The active power control method has a problem in that it becomes a factor making it difficult to establish a common base station that can provide two or more different services at the same time. That is, when a signal is transmitted from a base station to terminals using a wideband antenna for a common base station, a passive intermodulation noise of an antenna that is radiated at the time of transmitting the signal is input to a receiving antenna adjacent to a transmitting antenna, thereby considerably deteriorating signal reception performance. The deterioration in signal reception performance considerably deteriorates a QoS for various services that are provided from a base station to terminals located in a cell.

However, the common base station that can provide two or more different services at the same time has been increasingly required to reduce installation and operation costs of a base station system. Therefore, it is required to provide a power control method of a new base station that improves the existing active power control method.

SUMMARY OF THE INVENTION

The present invention has been made in an effort to provide base station transmitting and receiving antennas and control methods thereof, having advantages of increasing a channel capacity in a cell, ensuring a QoS in all terminals in the cell, and decreasing installation and operation costs of a base station system.

An exemplary embodiment of the present invention provides a control method of a base station transmitting antenna that controls the operation of a transmitting antenna in a base station. The control method includes collecting positional information and transmission level values of all terminals in a cell; analyzing statistics of cell traffic using the positional information and transmission level values, and generating antenna radiation patterns on the basis of the analyzed statistics result; optimizing the antenna radiation patterns by synthesizing beam patterns; and changing antenna beam patterns according to the optimized antenna radiation patterns.

Another embodiment of the present invention provides a base station transmitting antenna, which includes an up-converter that converts an intermediate frequency signal input from a baseband processing unit into a radio frequency signal; a transmission power distributing unit that converts the radio frequency signal to generate a plurality of first signals having the same amplitude and phase; a signal transmitting unit that converts the plurality of first signals and transmits the converted signals through a plurality of unit transmitting antennas; and a controller that detects levels of a plurality of second signals corresponding to the plurality of first signals and transmits the detected levels to the baseband processing unit, and controls antenna aperture vectors of each of the plurality of unit transmitting antennas.

Yet another embodiment of the present invention provides a base station receiving antenna, which includes a signal receiving unit that receives signals transmitted from terminals to generate a plurality of first signals; a reception power coupling unit that couples the plurality of first signals and generates a second signal; a down-converter that converts the second signal into an intermediate frequency signal and transmits the intermediate frequency signal to a baseband processing unit; and a controller that detects levels of a plurality of third signals corresponding to the plurality of first signals and transmits the detected levels to the baseband processing unit, and controls antenna aperture vectors of each of a plurality of unit receiving antennas.

According to the embodiments of the present invention, an active power control function is minimized and a passive power control method is used, thereby increasing a channel capacity in a cell and ensuring a QoS.

Further, the battery utilization time of the terminals can be increased and a cell coverage region can be extended, and the number of base stations and repeaters can be decreased to thereby reduce costs of a system facility.

Furthermore, since a passive intermodulation distortion problem can be resolved and a common base station that can simultaneously provide two or more different services can be installed, it is possible to reduce installation and operation costs of a base station system.

DETAILED DESCRIPTION OF THE EMBODIMENTS

Figure 1:
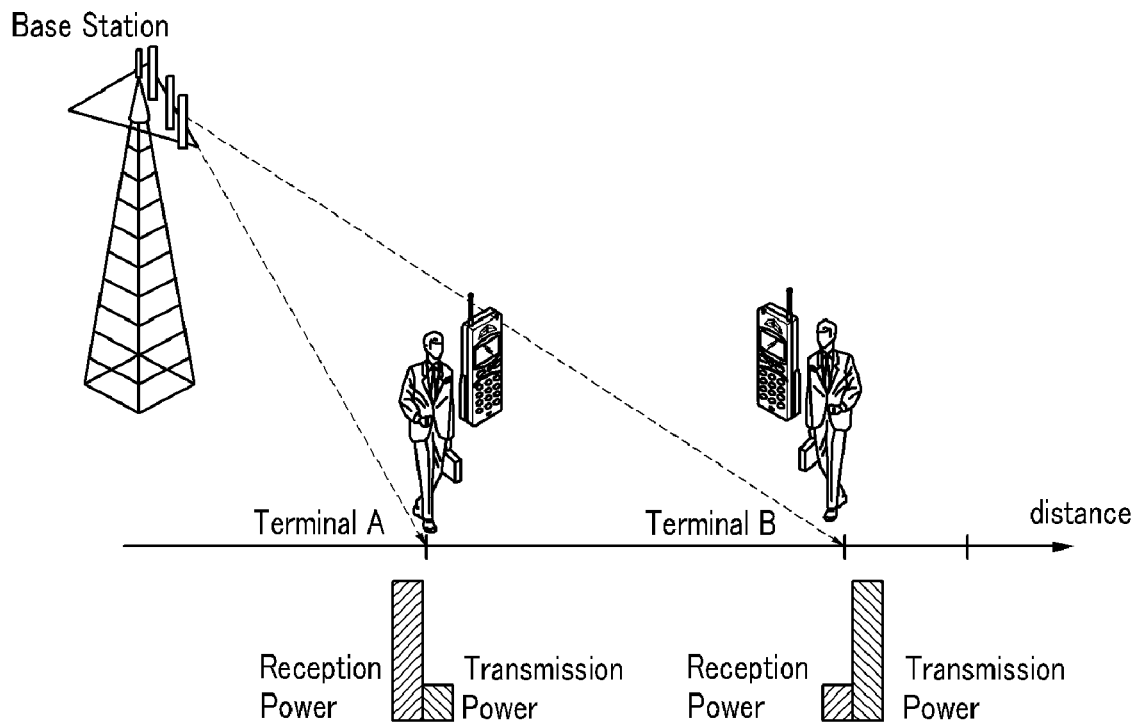
FIG. 1 is a schematic diagram illustrating a basic principle of power control of a base station using an active power control method.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "unit", "or", and "module" used herein mean one unit that processes a specific function or operation, and may be implemented by hardware or software and a combination thereof.

Hereinafter, base station transmitting and receiving antennas and control methods thereof according to an exemplary embodiment of the present invention will be described in detail with reference to the accompanying drawings.

Figure 3:
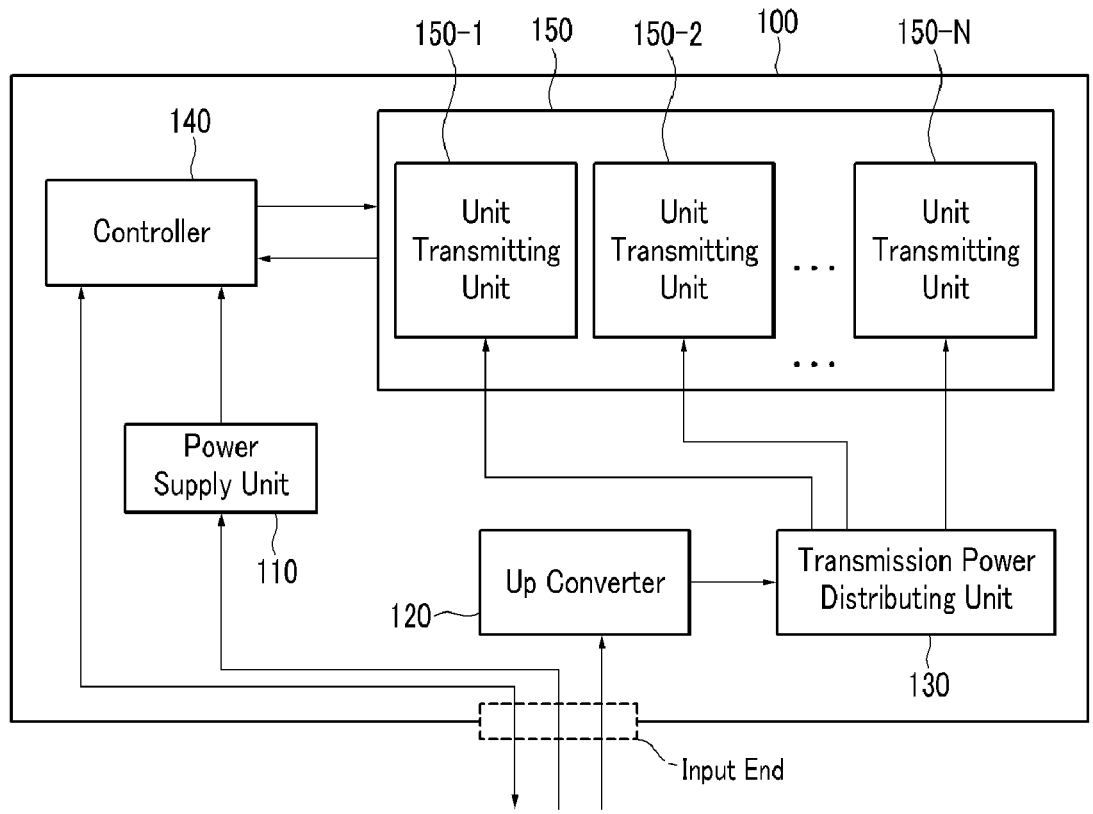
FIG. 3 is a diagram illustrating a base station transmitting antenna according to an exemplary embodiment of the present invention.

FIG. 3 is a diagram illustrating a base station transmitting antenna according to an exemplary embodiment of the present invention.

As shown in FIG. 3, a base station transmitting antenna 100 according to an exemplary embodiment of the present invention includes a power supply unit 110, an up-converter 120, a transmission power distributing unit 130, a controller 140, and a signal transmitting unit 150.

The power supply unit 110 converts AC power input through an input end into DC power and supplies the DC power to the controller 140.

The up-converter 120 converts an intermediate frequency (IF) signal input through an input end into a radio frequency (RF) signal and transmits the up-converted signal to the transmission power distributing unit 130.

The transmission power distributing unit 130 uses the radio frequency signal input from the up-converter 120 to generate signals, which are as many as there are unit transmitting units 150-1 to 150-N included in the signal transmitting unit 150 and that have the same amplitude and phase. The transmission power distributing unit 130 transmits the generated signals to the plurality of unit transmitting units 150-1 to 150-N, respectively.

The controller 140 detects levels of signals that are respectively amplified in the plurality of unit transmitting units 150-1 to 150-N included in the signal transmitting unit 150, and transmits the detected levels to a baseband processing unit (not shown) outside the base station transmitting antenna 100. The controller 140 synthesizes antenna radiation patterns and controls antenna aperture vectors.

Each of the plurality of unit transmitting units 150-1 to 150-N amplifies a signal input from the transmission power distributing unit 130 and subjects the signal to band filtering, and transmits the signal through a unit antenna (not shown).

The plurality of unit transmitting units 150-1 to 150-N are formed to have the same structure by grouping a plurality of radiation elements. Further, the unit antenna (not shown) that is included in each of the unit transmitting units 150-1 to 150-N is formed to have a two-dimensional active phase array antenna structure, such that it can arbitrarily adjust the aperture amplitude and phase distribution to control an elevation angle and an azimuth angle. Each of the unit antennas can be subjected to independent phase control without depending on a unit antenna included in another unit transmitting unit. Further, each of the unit antennas may be a hybrid antenna that includes a reflector and an active phase feeding array. Meanwhile, the plurality of unit transmitting units 150-1 to 150-N may be arranged one-dimensionally.

For reference, different from a structure shown in FIG. 3 in which the up-converter 120 is included in the base station transmitting antenna 100 according to the exemplary embodiment of the present invention, the up-converter 120 may be provided separately outside the base station transmitting antenna 100.

Hereinafter, the controller 140 according to the exemplary embodiment of the present invention will be described with reference to FIG. 4.

Figure 4:
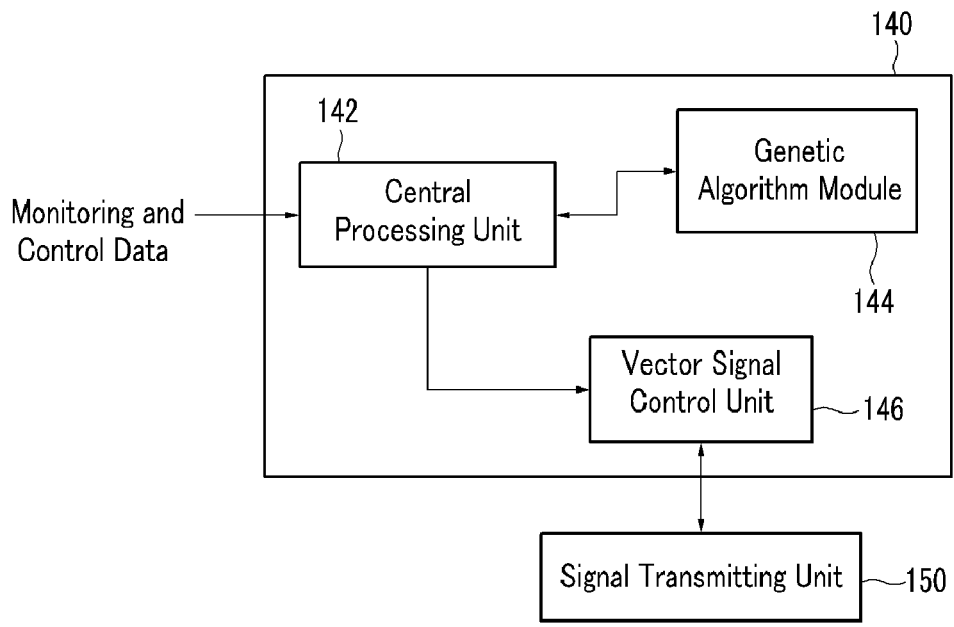
FIG. 4 is a diagram illustrating a controller according to an exemplary embodiment of the present invention.

FIG. 4 is a diagram illustrating a controller according to an exemplary embodiment of the present invention.

As shown in FIG. 4, the controller 140 according to the exemplary embodiment of the present invention includes a central processing unit 142, a genetic algorithm (GA) module 144, and a vector signal control unit 146.

The central processing unit 142 controls the genetic algorithm module 144 and the vector signal control unit 146 on the basis of monitoring and control data that are input from the baseband processing unit through an input end.

The genetic algorithm module 144 executes a genetic algorithm that is a type of a high-performance synthesis algorithm, and extracts antenna aperture vector information. Then, it is determined whether a channel capacity in a dense traffic area increases by performing cell channel capacity simulation, and it is determined whether the QoS is ensured in all terminals in a corresponding cell.

The vector signal control unit 146 uses the antenna aperture vector information extracted by the genetic algorithm module 144 to control a transmission signal amplitude and phase of each of the plurality of unit transmitting units 150-1 to 150-N, thereby controlling antenna aperture vectors to form antenna radiation patterns.

Hereinafter, the unit transmitting unit 150-1 according to the exemplary embodiment of the present invention will be described with reference to FIG. 5.

Figure 5:
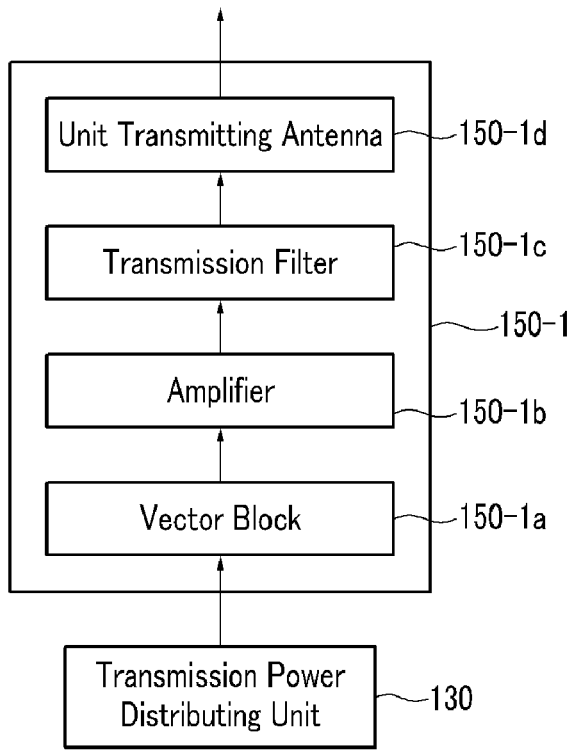
FIG. 5 is a diagram illustrating a unit transmitting unit according to an exemplary embodiment of the present invention.

FIG. 5 is a diagram illustrating a unit transmitting unit according to an exemplary embodiment of the present invention.

As shown in FIG. 5, the unit transmitting unit 150-1 according to the exemplary embodiment of the present invention includes a vector block 150-1a, an amplifier 150-1b, a transmission filter 150-1c, and a unit transmitting antenna 150-1d.

The vector block 150-1a controls an amplitude and phase of a signal that is input from the transmission power distributing unit 130 according to a control signal input from the controller 140.

The amplifier 150-1b amplifies the signal that is input from the vector block 150-1a and outputs the amplified signal. The transmission filter 150-1c is formed of a band-pass filter, and passes signals that correspond to a predetermined transmission band. When simultaneously passing two service transmission bands, the transmission filter 150-1c may be formed of a duplexer.

Figure 2:
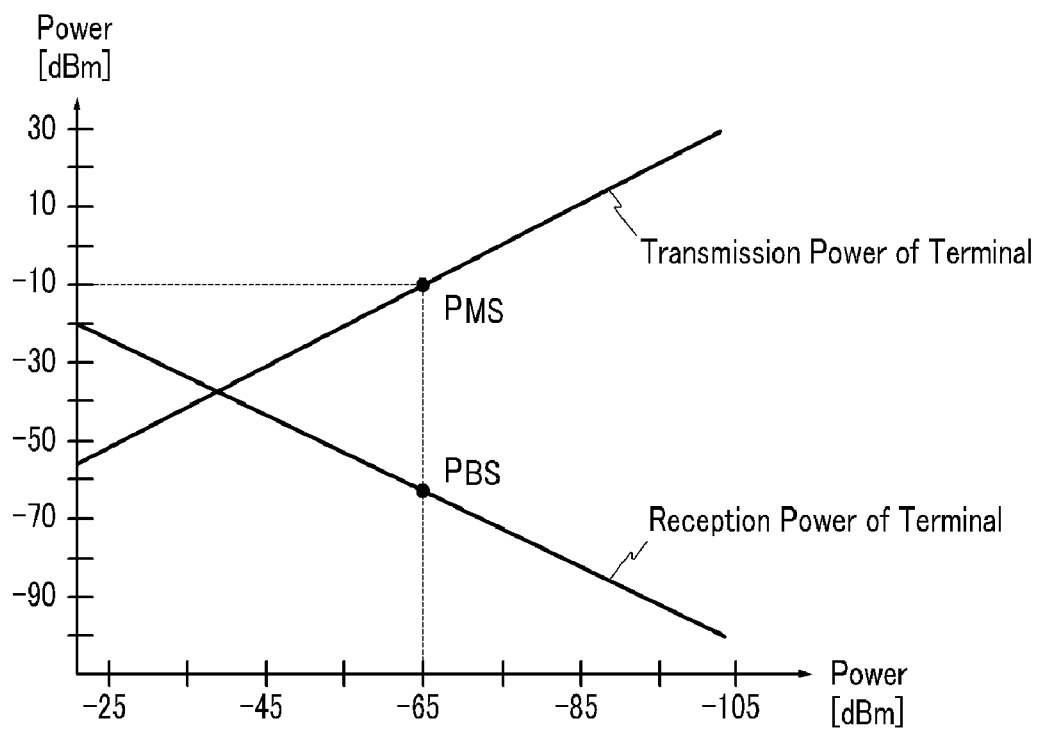
FIG. 2 is a diagram illustrating an example of active power control that allows a sum between power transmitted from a terminal to a base station and power of the terminal received from the base station to be maintained at a predetermined value.

The unit transmitting antenna 150-1d receives signals of which noise components have been removed by the transmission filter 150-1c and transmits the signals to the terminals. The active power control method that is shown in FIGS. 1 and 2 performs forward and backward link power control on the basis of open-loop power control and closed-loop power control. That is, the active power control method controls power that is supplied from the baseband processing unit to the base station antenna. Meanwhile, the base station transmitting antenna 100 according to the exemplary embodiment of the present invention that is shown in FIGS. 3 to 5 performs a passive power control method in which predetermined power is supplied from the baseband processing unit and is distributed to terminals in a cell on the basis of a power flux density concept through the beam pattern synthesis of the base station transmission antenna 100. That is, the base station according to the exemplary embodiment of the present invention simultaneously performs the active power control by the baseband processing unit and the passive power control by the base station transmitting antenna 100, such that a uniform power flux density distribution and a uniform weight power flux density distribution are provided to the cell to provide an excellent QoS.

Hereinafter, a radiation pattern and a power flux density pattern of the base station transmitting antenna 100 according to the first and second exemplary embodiments of the present invention will be described with reference to FIGS. 6 to 11.

For reference, in FIGS. 6 to 11, $H_{tower}$ indicates the height of the base station transmitting antenna 100, and $L_{s,c}$ indicates the inclination length from the base station transmitting antenna 100 to the cell radius. Further, $L_{s,peak}$ indicates the inclination length from the base station transmitting antenna 100 to a maximum point of a beam pattern, and $R_{cell}$ indicates the horizontal length from the base station transmitting antenna 100 to the cell radius (cell range). Furthermore, PFD indicates a power flux density in a cell, and $\Delta R_{cell}$ indicates the cell extension length (service cell extent).

Figure 6:
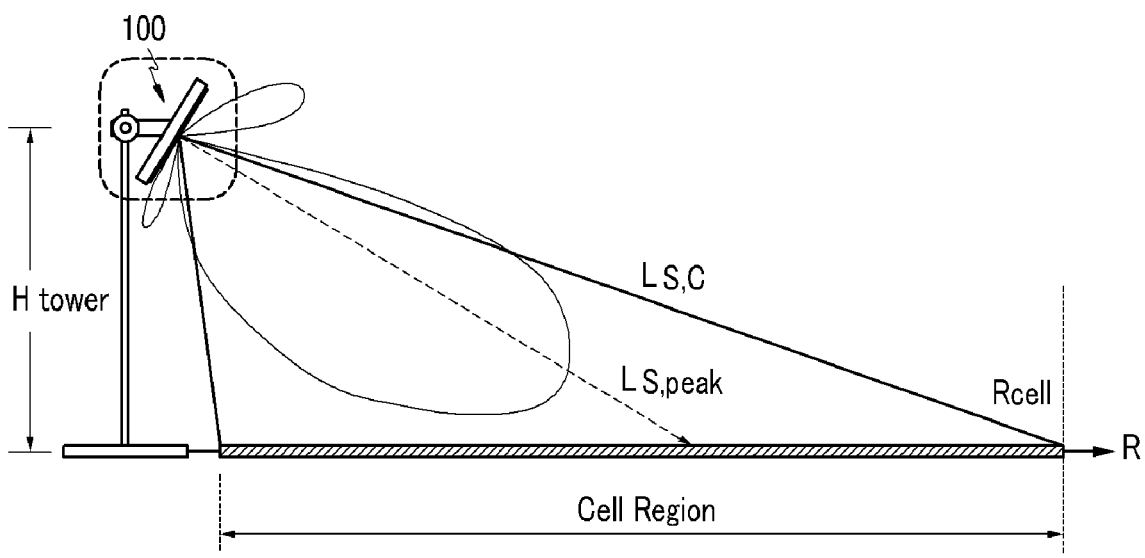
FIG. 6 is a diagram illustrating a radiation pattern from a base station transmitting antenna according to a first exemplary embodiment of the present invention.

FIG. 6 is a diagram illustrating a radiation pattern of a base station transmitting antenna according to a first exemplary embodiment of the present invention.

As shown in FIG. 6, the base station transmitting antenna 100 according to the exemplary embodiment of the present invention generates a radiation pattern that provides a power flux density in consideration of an elevation angle service distance from the center of a cell using the passive power control method. At this time, in order to provide a uniform power flux density distribution, the radiation pattern of the base station transmitting antenna 100 according to the first exemplary embodiment of the present invention becomes a cosecant beam pattern.

Meanwhile, the structure shown in FIG. 6 is only exemplary, and the base station transmitting antenna 100 according to the exemplary embodiment of the present invention may generate a one-dimensional radiation pattern in which only an elevation angle from the center of the cell is taken into consideration and a two-dimensional radiation pattern in which both an elevation angel and an azimuth angle from the center of the cell are taken into consideration.

Figure 7:
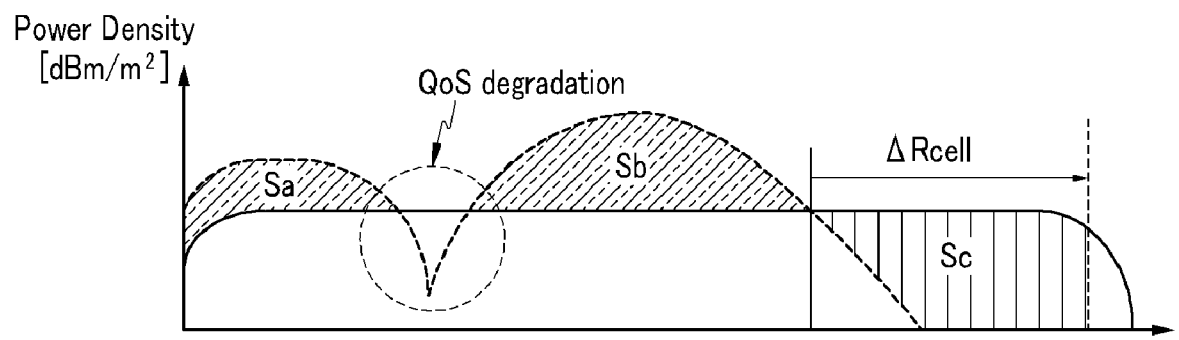
FIG. 7 is a diagram illustrating a power flux density according to a distance in a cell range that corresponds to a radiation pattern from a base station transmitting antenna according to a first exemplary embodiment of the present invention.

FIG. 7 is a diagram illustrating a power flux density according to a distance in a cell range that corresponds to a radiation pattern of a base station transmitting antenna according to a first exemplary embodiment of the present invention. For reference, in FIG. 7, a power flux density in a cell that corresponds to a radiation pattern of a general base station transmitting antenna is shown by dotted lines, and a power flux density in a cell that corresponds to a radiation pattern of the base station transmitting antenna 100 according to the first exemplary embodiment of the present invention is shown by solid lines.

As shown in FIG. 7, a QoS degradation area exists in the radiation pattern of the general base station transmitting antenna that uses the active power control method. In contrast, a QoS degradation area does not exist in the radiation pattern of the base station transmitting antenna 100 according to the first exemplary embodiment of the present invention that uses the passive power control method. If using the radiation pattern of the base station transmitting antenna 100 according to the first exemplary embodiment of the present invention, a cell range is extended by a cell extension length $\Delta$Rcell. An area Sc that corresponds to the cell extension length $\Delta$Rcell is equal to a sum between areas Sa and Sb having the high power flux density when using the radiation pattern of the general base station transmitting antenna.

Figure 8A:
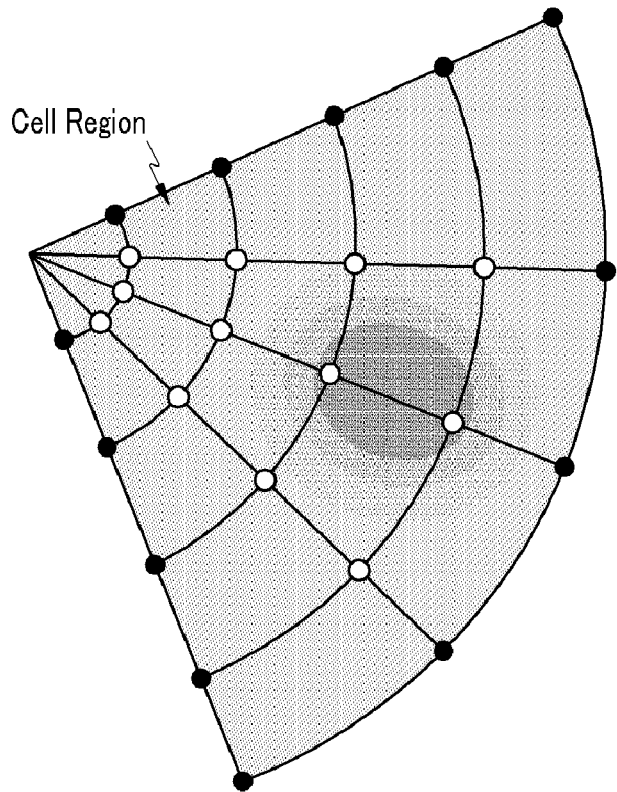
FIG. 8A is a diagram illustrating a radiation pattern from a general base station transmitting antenna.
Figure 8B:
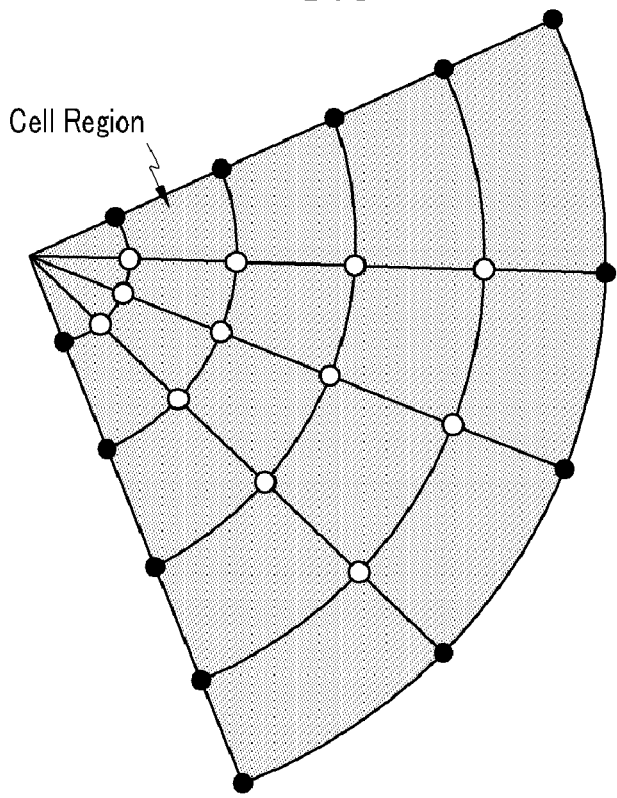
FIG. 8B is a diagram illustrating a radiation pattern from a base station transmitting antenna according to a first exemplary embodiment of the present invention.

FIG. 8A is a diagram illustrating a radiation pattern of a general base station transmitting antenna, and FIG. 8B is a diagram illustrating a radiation pattern of a base station transmitting antenna according to a first exemplary embodiment of the present invention.

Different from the radiation pattern of the general base station transmitting antenna shown in FIG. 8A, a power flux density distribution is uniform in the radiation pattern of the base station transmitting antenna 100 according to the first exemplary embodiment of the present invention shown in FIG. 8B.

Figure 9:
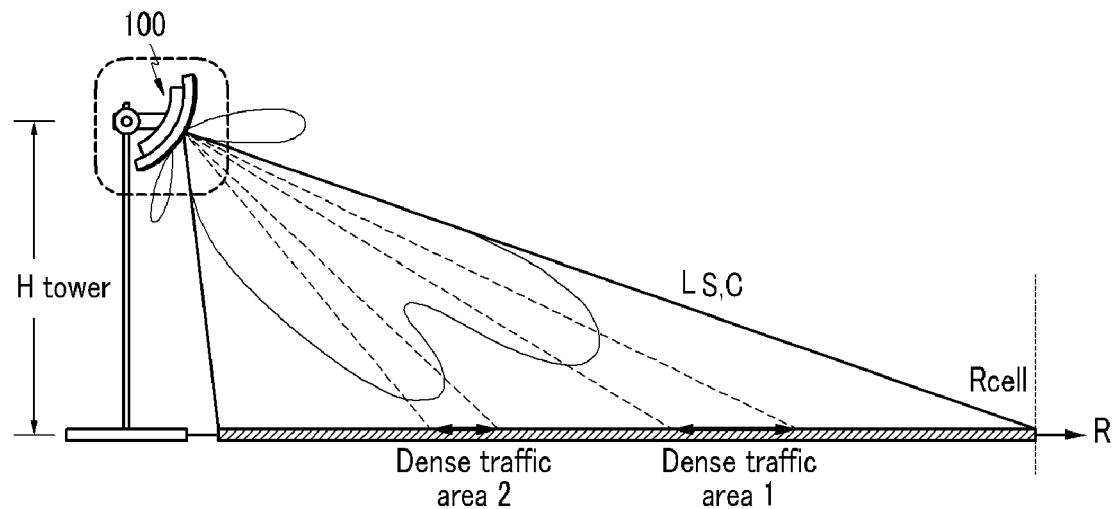
FIG. 9 is a diagram illustrating a radiation pattern from a base station transmitting antenna according to a second exemplary embodiment of the present invention according to an elevation angle distance.
Figure 10:
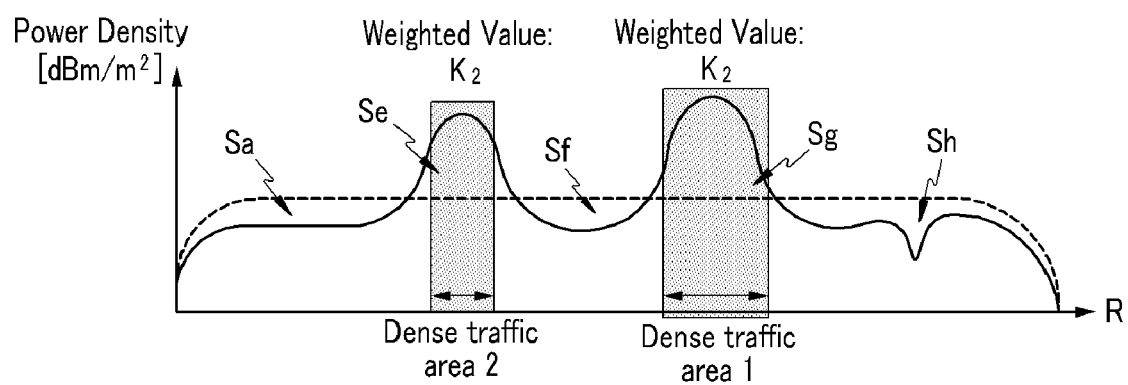
FIG. 10 is a diagram illustrating a power flux density according to an elevation angle distance in a cell that corresponds to a radiation pattern from a base station transmitting antenna according to a second exemplary embodiment of the present invention.
Figure 11:
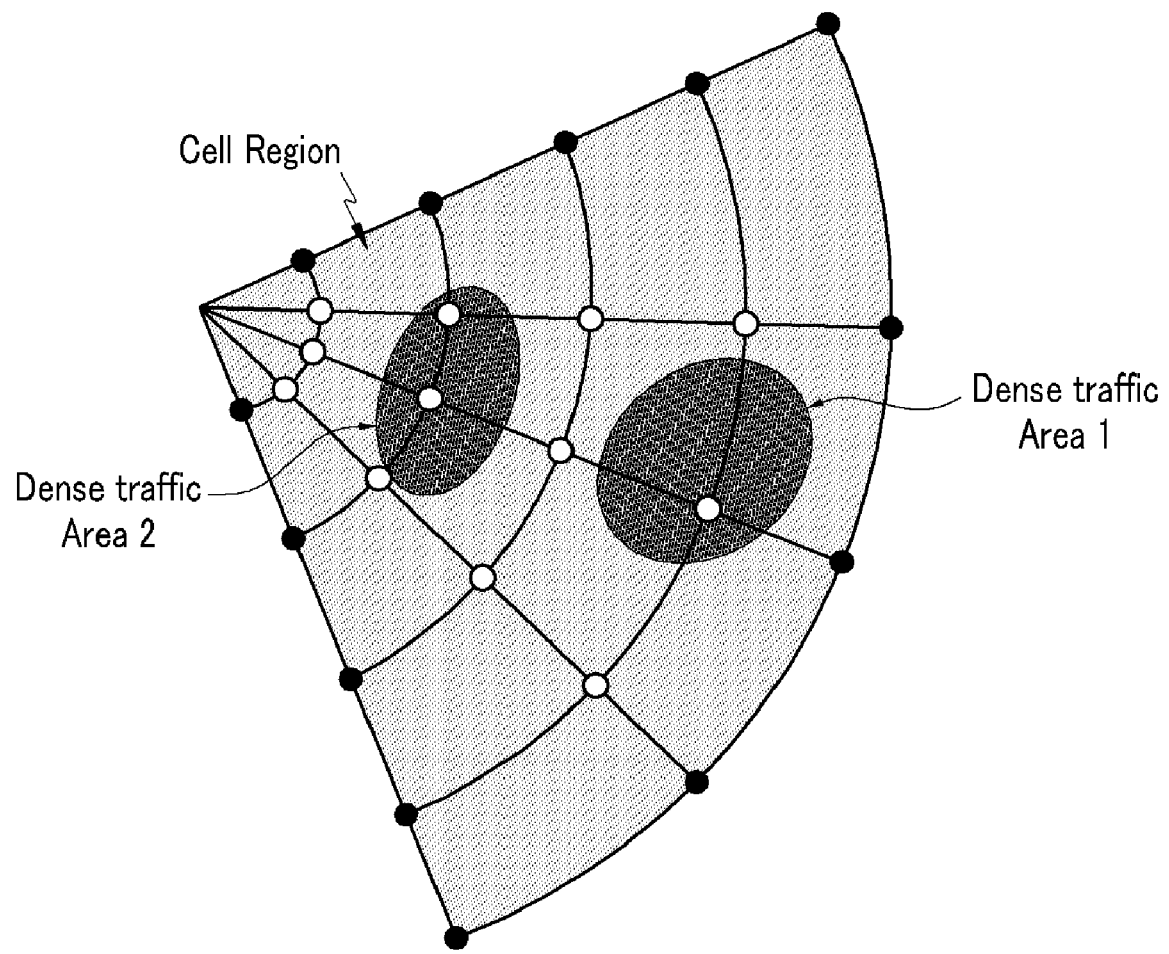
FIG. 11 is a diagram illustrating a power flux density pattern in a service cell of a base station transmitting antenna according to a second exemplary embodiment of the present invention.

In FIGS. 6 to 8B, it is assumed that radio wave fading does not occur in the radiation pattern of the base station transmitting antenna 100 according to the first exemplary embodiment of the present invention. Unlike this, in an actual cell communication environment in which radio wave fading and a shadow area are taken into consideration, in order to provide a uniform power flux density distribution, statistical data measured at all points in a cell are collected, and the beam pattern synthesis is performed on the basis of the collected statistical data, which will be described below with reference to FIGS. 9 to 11. For reference, a base station transmitting antenna 100 according to a second exemplary embodiment of the present invention that is shown in FIGS. 9 to 11 generates a radiation pattern that provides a power flux density in consideration of an elevation angle service distance from the center of a cell using the passive power control method. At this time, in order to provide the uniform power flux density distribution, the radiation pattern of the base station transmitting antenna 100 according to the second exemplary embodiment of the present invention becomes a cosecant beam pattern. Meanwhile, the base station transmitting antenna 100 according to the exemplary embodiment of the present invention may generate a one-dimensional radiation pattern in which only an elevation angle from the center of the cell is taken into consideration and a two-dimensional radiation pattern in which both an elevation angle and an azimuth angle from the center of the cell are taken into consideration.

FIG. 9 is a diagram illustrating a radiation pattern of a base station transmitting antenna according to the second exemplary embodiment of the present invention according to an elevation angle distance. FIG. 10 is a diagram illustrating a power flux density according to an elevation angle distance in a cell that corresponds to a radiation pattern of a base station transmitting antenna according to the second exemplary embodiment of the present invention. FIG. 11 is a diagram illustrating a power flux density pattern in a service cell of a base station transmitting antenna according to the second exemplary embodiment of the present invention. For reference, in FIG. 10, the power flux density in the cell that corresponds to the radiation pattern of the base station transmitting antenna according to the first exemplary embodiment of the present invention is shown by dotted lines, and the power flux density in the cell that corresponds to the radiation pattern of the base station transmitting antenna 100 according to the second exemplary embodiment of the present invention is shown by solid lines.

The radiation pattern of the base station transmitting antenna 100 according to the second exemplary embodiment of the present invention according to the elevation angle distance that is shown in FIG. 9 is based on a cosecant beam pattern using the passive power control method. Since beam patterns are synthesized using statistical data in a cell, a power flux density is high in dense traffic areas in the radiation pattern. The radiation pattern of the base station transmitting antenna 100 according to the second exemplary embodiment of the present invention is based on the cosecant beam pattern using the passive power control method. As a result, the cell range shown in FIG. 10 is extended, as described with reference to FIG. 8. The base station transmitting antenna 100 provides a power flux density that is relatively larger than a uniform power flux density distribution to a first dense traffic area and a second dense traffic area in the cell. As shown in FIG. 10, power densities in areas other than the first and second dense traffic areas become lower than the power flux density in the radiation pattern of the base station transmitting antenna 100 according to the first exemplary embodiment of the present invention shown in FIG. 7 by increments Se and Sg in power densities of the first and second dense traffic areas. That is, in FIG. 10, a sum (Se+Sg) between the increments in power densities of the first and second dense traffic areas is equal to a sum (Sd+Sf+Sh) between decrements in power densities of the other areas.

As shown in FIG. 11, the radiation pattern of the base station transmitting antenna 100 according to the second exemplary embodiment of the present invention implements a weight power flux density distribution that indicates a higher power flux density by weighted values $K_1$ and $K_2$ of the first and second dense traffic areas.

Hereinafter, a control method of the base station transmitting antenna 100 that generates the radiation pattern according to the second exemplary embodiment of the present invention will be described with reference to FIG. 12.

Figure 12:
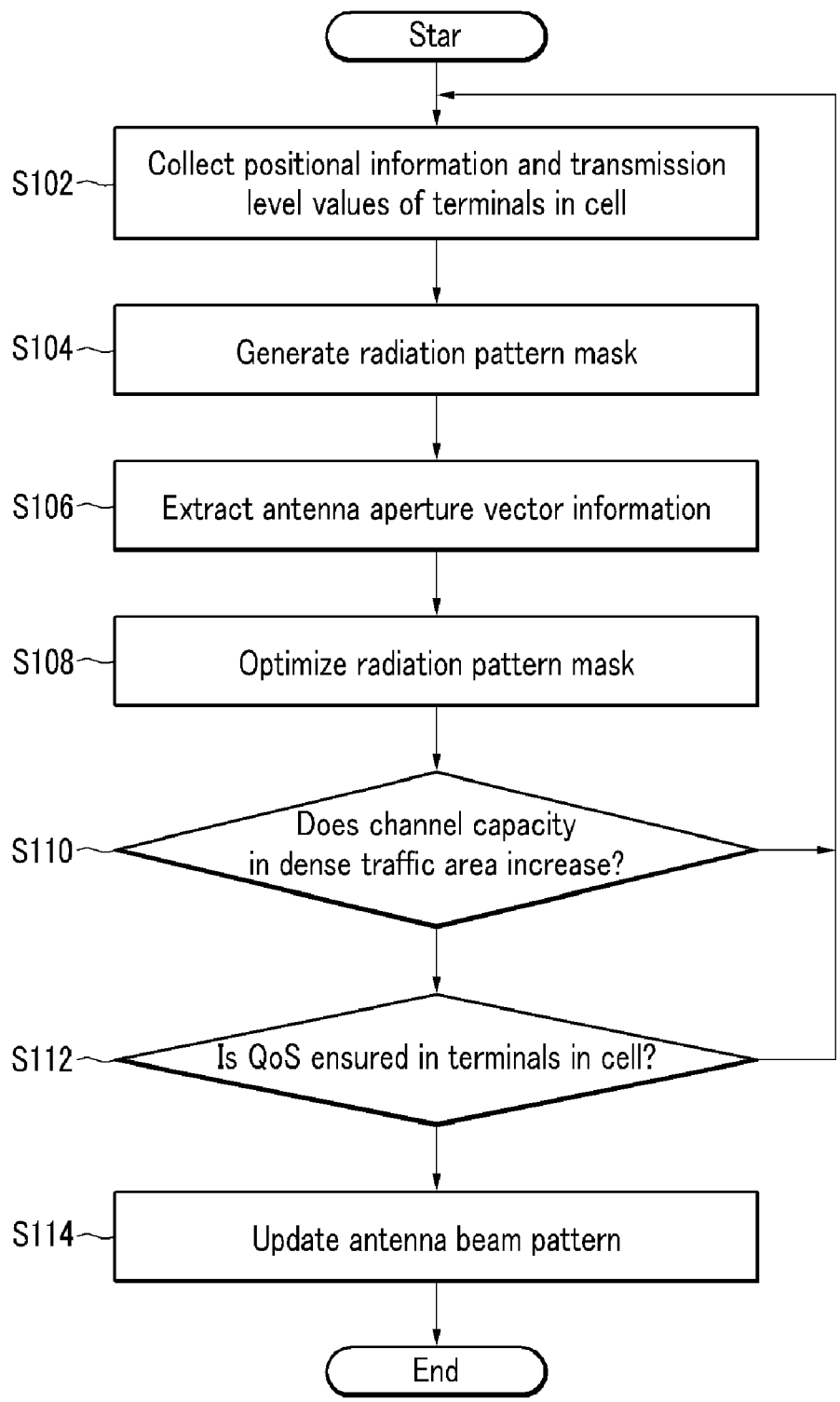
FIG. 12 is a flowchart illustrating a control method of a base station transmitting antenna according to an exemplary embodiment of the present invention.

FIG. 12 is a flowchart illustrating a control method of a base station transmitting antenna according to an exemplary embodiment of the present invention.

First, terminals that set a communication link with a base station transmit GPS-based positional information and transmission level values to the base station, and the base station collects the positional information and transmission level values of all the terminals in a cell (step S102). At this time, the baseband processing unit of the base station uses the active power control method in real time in order to set a communication link with the terminals.

After performing the process corresponding to step S102, the base station uses the collected positional information and transmission level values of all the terminals in the cell to analyze statistics of cell traffic semi-continuously, and generates a request radiation pattern mask for an antenna radiation pattern that is most suitable for the current cell (step S104).

After generating the radiation pattern mask by performing the process corresponding to Step s104, the base station uses the genetic algorithm module 144 to perform an actual radiation pattern optimizing process (step S106) that is suitable for the request radiation pattern mask through a genetic algorithm to be a type of a high-performance pattern synthesis algorithm. Then, from the obtained result, the base station extracts new antenna aperture vector information (step S108). At this time, the base station gives weighted values to pattern areas that correspond to the dense traffic areas at the time of executing the high-performance pattern synthesis algorithm. As a result, the radiation pattern of the base station transmitting antenna 100 according to the second exemplary embodiment of the present invention shown in FIGS. 9 to 11 may be generated. FIG. 12 is a diagram illustrating contents that correspond to generating a radiation pattern of a base station transmitting antenna according to the second exemplary embodiment of the present invention. In this case, if the weighted values are not given, it is natural that the radiation pattern of the base station transmitting antenna according to the first exemplary embodiment of the present invention shown in FIGS. 6 to 8 will be generated.

After performing the process corresponding to step S108, the base station actually generates a beam pattern and performs cell capacity simulation using the beam pattern, and determines whether a channel capacity in a service cell increases (step S110).

When it is determined in step S110 that the channel capacity does not increase, the base station repeats the processes corresponding to steps after step S102 in which the positional information and transmission level values of all the terminals in the corresponding cell are collected.

In contrast, when it is determined in step S110 that the channel capacity increases, the base station determines whether the QoS is ensured in all the terminals in the corresponding cell (step S112).

When it is determined in step S112 that the QoS is not ensured in all the terminals in the cell, the base station repeats the processes corresponding to steps after step S102 in which the positional information and transmission level values of all the terminals in the corresponding cell are collected.

When it is determined in step S112 that the QoS is ensured in all the terminals in the cell, the base station updates the antenna beam pattern of the base station transmitting antenna 100 (step S114). As a result, the base station can generate a radiation pattern that is the most suitable for a current cell traffic situation. For reference, when the base station performs the passive power control, passive power control information may need to be exchanged between neighboring base stations in consideration of soft handover between cells.

Hereinafter, the base station receiving antenna 200 according to the exemplary embodiment of the present invention will be described with reference to FIG. 13.

Figure 13:
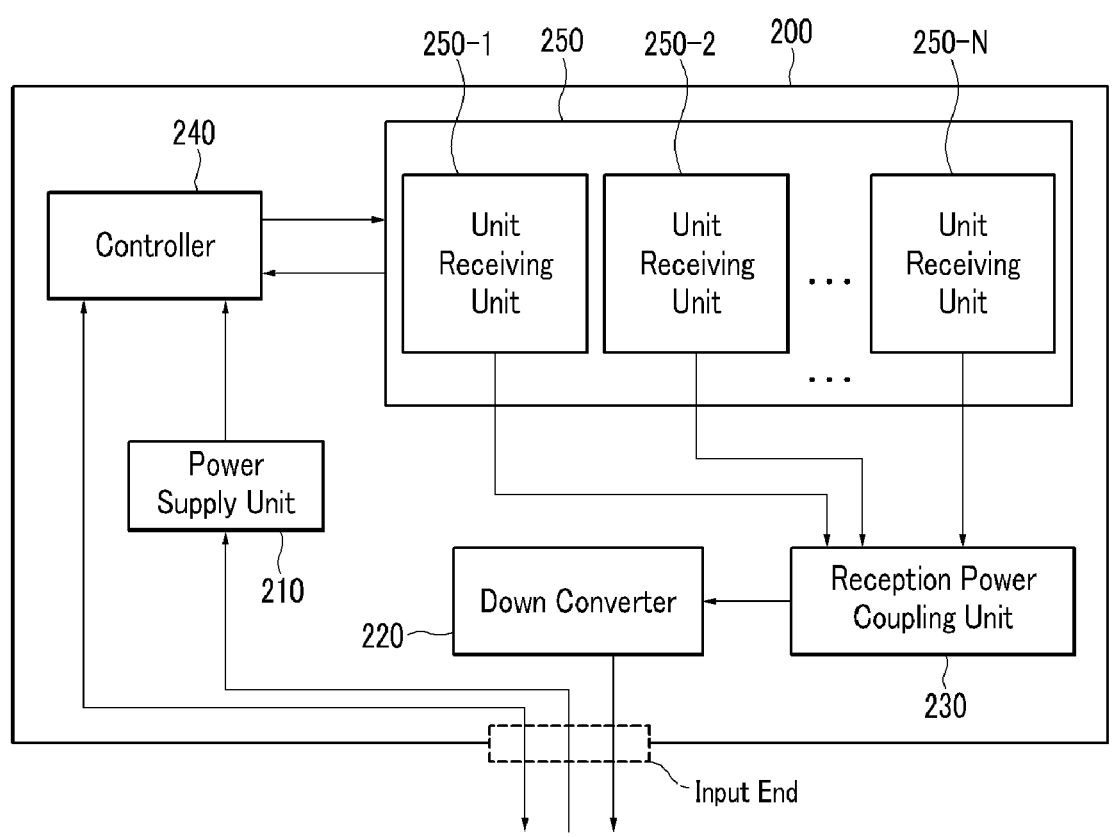
FIG. 13 is a diagram illustrating a base station receiving antenna according to an exemplary embodiment of the present invention.

FIG. 13 is a diagram illustrating a base station receiving antenna according to an exemplary embodiment of the present invention.

As shown in FIG. 13, the base station receiving antenna 200 according to the exemplary embodiment of the present invention includes a power supply unit 210, a down-converter 220, a reception power coupling unit 230, a controller 240, and a signal receiving unit 250.

The power supply unit 210 converts AC power input through an input end into DC power and supplies the DC power to the controller 240.

The down-converter 220 converts a radio frequency signal input from the reception power coupling unit 230 into an intermediate frequency signal, and transmits the down-converted signal to a baseband processing unit through an input end.

The reception power coupling unit 230 couples radio frequency signals respectively from a plurality of unit receiving units 250-1 to 250-N and transmits the radio frequency signal to the down-converter 220.

The controller 240 detects levels of the signals respectively amplified in the plurality of unit receiving units 250-1 to 250-N of the signal receiving unit 250 and transmits the detected levels to the baseband processing unit (not shown) outside the base station receiving antenna 200. Further, the controller 240 synthesizes antenna radiation patterns and controls a receiving antenna aperture distribution.

The signal receiving unit 250 includes the plurality of unit receiving units 250-1 to 250-N. Each of the plurality of unit receiving units 250-1 to 250-N filters a signal input through a unit antenna (not shown) to remove noise, and transmits the signal to the reception power coupling unit 230.

The plurality of unit receiving units 250-1 to 250-N are formed to have the same structure by grouping a plurality of radiation elements. Further, a unit antenna (not shown) that is included in each of the unit receiving units 250-1 to 250-N is formed to have a two-dimensional active phase array antenna structure that can arbitrarily control aperture amplitude and phase distribution to control an elevation angle and an azimuth angle. The unit antenna can be subjected to independent phase control without depending on a unit antenna included in another unit transmitting unit. The unit antenna may be a hybrid antenna that includes a reflector and an active phase feeding array. Meanwhile, the unit receiving units 250-1 to 250-N may be disposed one-dimensionally.

For reference, different from the structure shown in FIG. 13 in which the down-converter 220 is included in the base station receiving antenna 200 according to the exemplary embodiment of the present invention, the down-converter 220 may be installed separately outside the base station receiving antenna 200.

Hereinafter, the unit receiving unit 250-1 according to the exemplary embodiment of the present invention will be described with reference to FIGS. 14 and 15.

Figure 14:
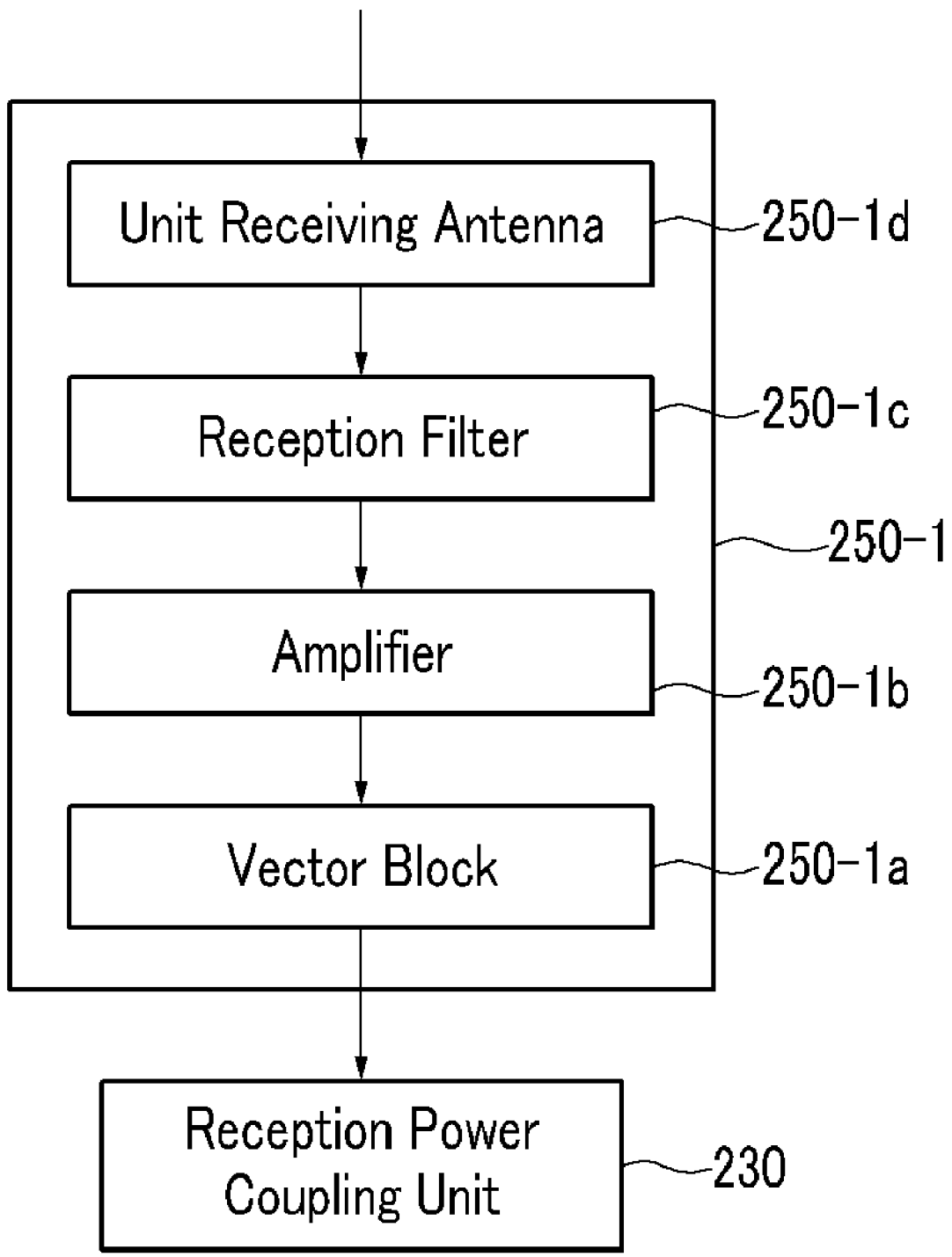
FIG. 14 is a diagram illustrating a unit receiving unit according to an exemplary embodiment of the present invention.

FIG. 14 is a diagram illustrating a unit receiving unit according to an exemplary embodiment of the present invention.

As shown in FIG. 14, the unit receiving unit 250-1 according to the exemplary embodiment of the present invention includes a vector block 250-1a, an amplifier 250-1b, a reception filter 250-1c, and a unit receiving antenna 250-1d.

The unit receiving antenna 250-1d receives a signal from a terminal and transmits the received signal to the reception filter 250-1c.

The reception filter 250-1c filters a signal that is input from the unit receiving antenna 250-1d. In this case, the reception filter 250-1c is formed similar to the transmission filter 150-1c of the base station transmitting antenna 100. That is, the reception filter 250-1c is formed of a duplexer to simultaneously pass two service reception bands or a band-pass filter to pass one service reception band.

The amplifier 250-1b amplifies the signal that is output after being filtered by the reception filter 150-1c.

The vector block 250-1a transmits the signal received from the amplifier 250-1b to the reception power coupling unit 230.

Hereinafter, the operations of the unit transmitting unit 150-1 of the base station transmitting antenna 100 and the unit receiving unit 250-1 of the base station receiving antenna 200 according to the exemplary embodiment of the present invention will be described with reference to FIG. 15.

Figure 15:
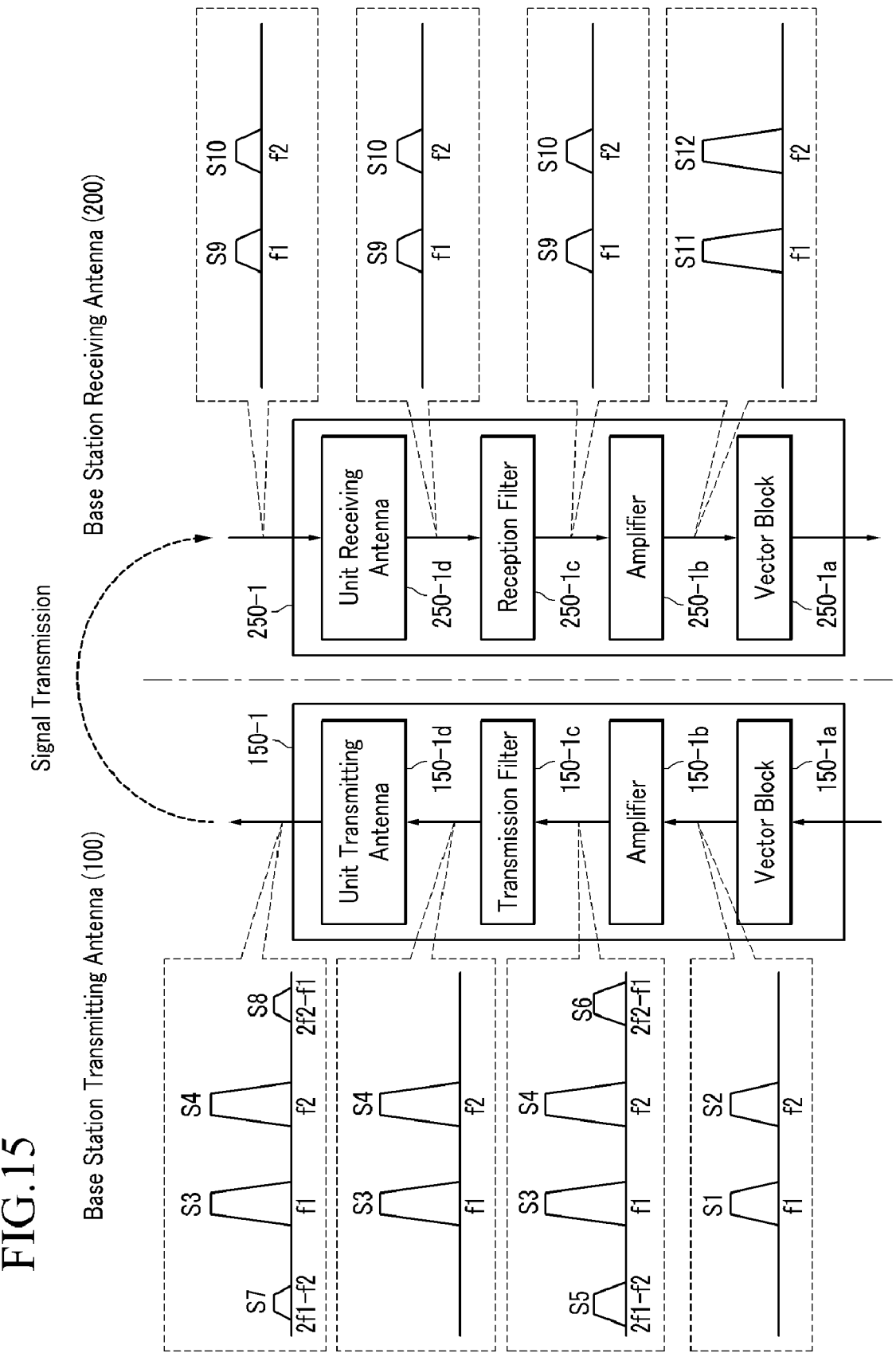
FIG. 15 is a diagram illustrating an output signal from each of constituent elements that are included in a unit transmitting unit of a base station transmitting antenna and a unit receiving unit of a base station receiving unit according to an exemplary embodiment of the present invention.

FIG. 15 is a diagram illustrating an output signal of each of constituent elements that are included in a unit transmitting unit of a base station transmitting antenna and a unit receiving unit of a base station receiving antenna according to an exemplary embodiment of the present invention.

The vector block 150-1a controls an amplitude and phase of a signal input from the transmission power distributing unit 130 according to a control signal input from the controller 140, and generates two basic signals S1 and S2 that use frequencies f1 and f2 as central frequencies.

The amplifier 150-1b amplifies the two basic signals S1 and S2 that are input from the vector block 150-1a and outputs generated signals S3 and S4. At this time, due to a non-linear characteristic in the amplifier 150-1b, an output signal from the amplifier 150-1b includes active intermodulation distortion (hereinafter simply referred to as AIMD) signals S5 and S6. In this case, the signal S5 has a central frequency (2f1-f2) that is lower than the central frequency f1 of the signal S3, and the signal S6 has a central frequency (2f2-f1) that is higher than the central frequency f2 of the signal S4.

As shown in FIG. 15, the transmission filter 150-1c is formed of a duplexer to simultaneously pass signals corresponding to the two service transmission bands f1 and f2, and passes the signals S3 and S4 without modulating the signals but removes the active intermodulation distortion signals S5 and S6 from the amplifier 150-1b.

The unit transmitting antenna 150-1d receives signals of which noise components S5 and S6 have been removed by the transmission filter 150-1c, and transmits the signals to the terminals. At this time, weak passive intermodulation distortion (hereinafter simply referred to as PIMD) signals S7 and S8 are generated by the unit transmitting antenna 150-1d. As a result, the signals radiated from the unit transmitting antenna 150-1d become the signals S3, S4, S7, and S8. As shown in FIG. 15, the central frequencies of the passive intermodulation distortion signals S7 and S8 are shown to be the same as the central frequencies of the active intermodulation distortion signals S5 and S6.

Among the signals S3, S4, S7, and S8 that are radiated from the unit transmitting antenna 150-1d of the base station transmitting antenna 100, the signals S7 and S8 are faded due to attenuation until reaching the base station receiving antenna 200. The magnitude of the other signals S3 and S4 decreases due to attenuation, like the signals S9 and S10. For reference, FIG. 15 shows a case where the passive intermodulation distortion signals S7 and S8 are weak. However, even if the passive intermodulation distortion signals S7 and S8 are not completely faded due to attenuation but reach the base station receiving antenna 200, the passive intermodulation distortion signals S7 and S8 are removed while passing through the reception filter 250-1c.

Meanwhile, the weak received signals S9 and S10 that are received through the unit receiving antenna 250-1d pass through the reception filter 250-1c, and are then transmitted to the reception power coupling unit 230 through the vector block 250-1a in a type of the received signals S11 and S12 that are amplified by the amplifier 250-1b.

The base station transmitting antenna 100 and the base station receiving antenna 200 according to the exemplary embodiment of the present invention that have been described above may be coupled to the general baseband coupling unit, thereby forming a base station. Hereinafter, the base station that is formed by coupling the base station receiving antenna 200 according to the exemplary embodiment of the present invention and the general baseband processing unit will be described with reference to FIG. 16.

Figure 16:
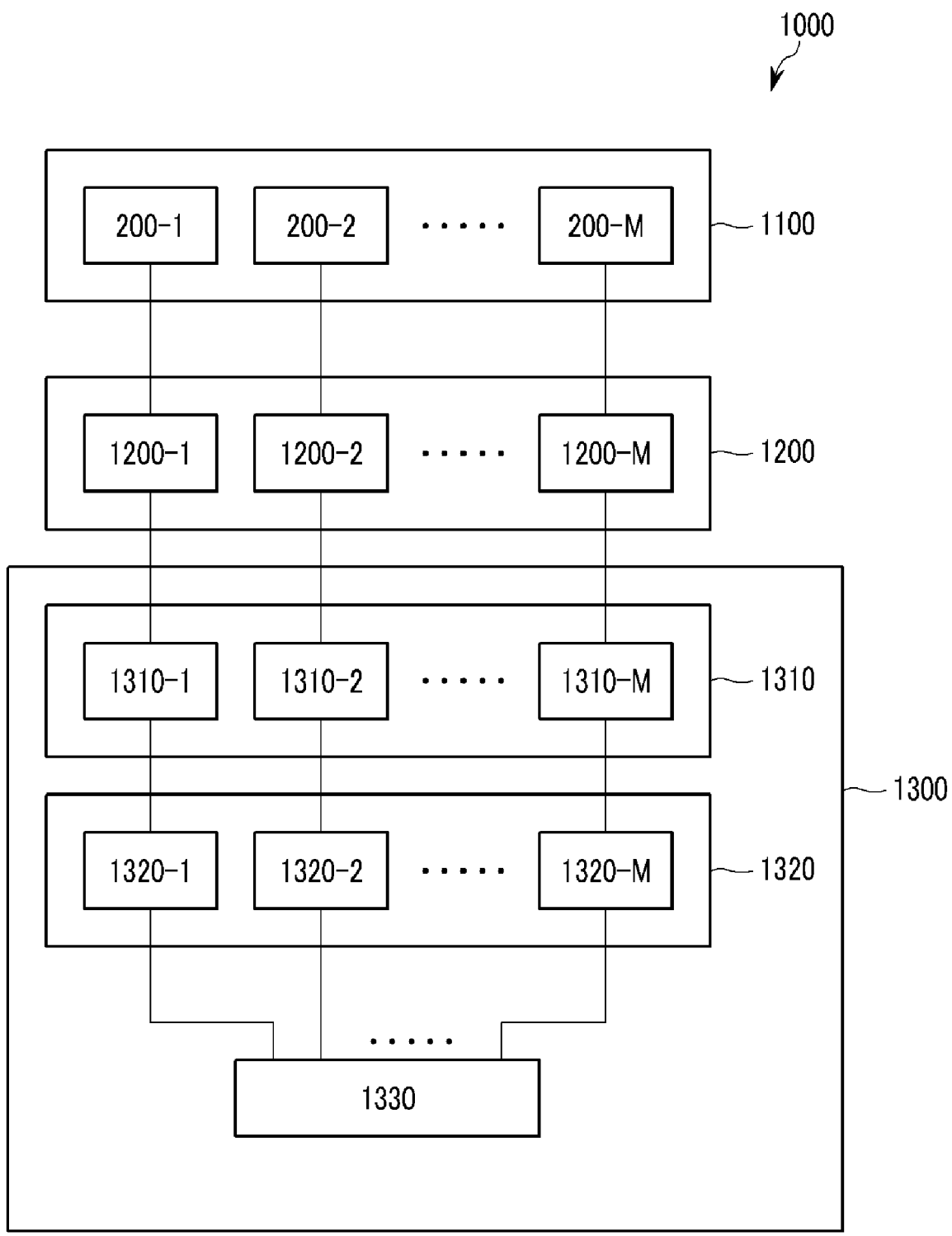
FIG. 16 is a diagram illustrating a base station that is formed by coupling a base station receiving antenna according to an exemplary embodiment of the present invention to a general baseband signal processing module.

FIG. 16 is a diagram illustrating a base station 1000 that is formed by coupling a base station receiving antenna 200 according to an exemplary embodiment of the present invention and a baseband signal processing module of a smart antenna.

As shown in FIG. 16, the base station 1000 according to the exemplary embodiment of the present invention includes a multiplexing receiving antenna unit 1100, a multiplexing cable block 1200, and a baseband processing unit 1300.

The multiplexing receiving antenna unit 1100 includes a plurality of base station receiving antennas 200-1 to 200-M that are disposed one-dimensionally.

The multiplexing cable block 1200 includes a plurality of coaxial cables 1200-1 to 1200-M. The plurality of coaxial cables 1200-1 to 1200-M are used for communication and control data transmission/reception between input ends (not shown) of the plurality of base station receiving antennas 200-1 to 200-M and the baseband processing unit 1300.

The baseband processing unit 1300 includes an analog-to-digital converter (ADC) 1310, a modem unit 1320, and a digital beamforming unit 1330.

The analog-to-digital converter 1310 includes a plurality of analog-to-digital converting units 1310-1 to 1310-M, and the modem unit 1320 includes a plurality of modems 1320-1 to 1320-M.

The digital beamforming unit 1330 executes a digital beamforming algorithm that is a type of a high-performance pattern synthesis algorithm and enables adaptive beamforming.

At this time, the digital beamforming unit 1330 performs adaptive beamforming with respect to an azimuth angle direction. In addition, with respect to an elevation angle direction, the plurality of base station receiving antennas 200-1 to 200-M of the multiplexing receiving antenna unit 1100 each perform a passive power control method though the beam pattern synthesis. At this time, it is natural that aperture vector distribution data that is used when converting a radiation pattern to perform passive power control be applied to channel correction data of an antenna.

The base station according to the exemplary embodiment of the present invention that has been described above uses both the active power control performed by the baseband processing unit 1300 and the passive power control performed by the base station transmitting and receiving antennas 100 and 200. Now, a relationship between transmission power and reception power of terminals in a cell will be described with reference to FIG. 17.

Figure 17:
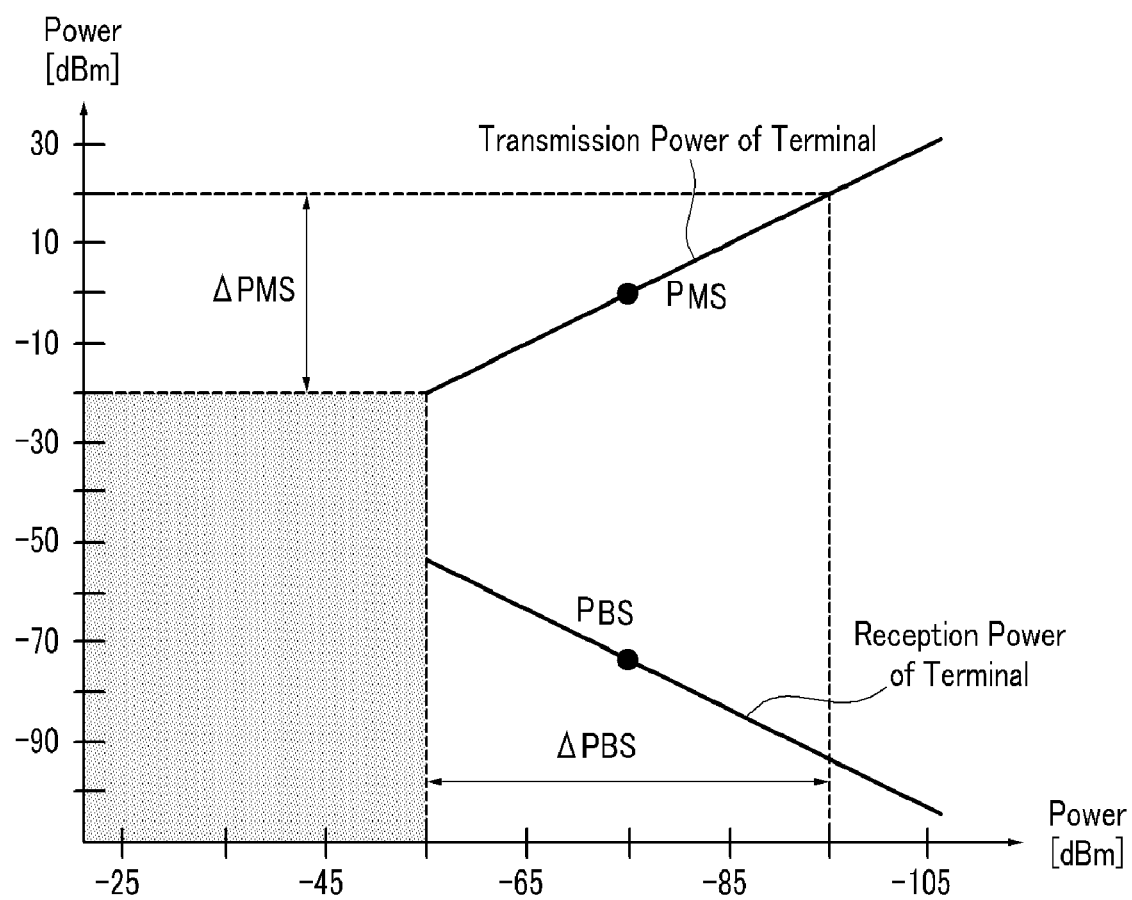
FIG. 17 is a diagram illustrating a relationship between transmission power and reception power of a terminal according to an exemplary embodiment of the present invention.

FIG. 17 is a diagram illustrating a relationship between transmission power and reception power of a terminal according to an exemplary embodiment of the present invention. For reference, in FIG. 17, $P_{MS}$ and $P_{BS}$ indicate transmission power from a terminal to a base station and reception power of the terminal from the base station, respectively, similar to the case of FIG. 2. Further, $\Delta P_{MS}$ indicates an active power control range of the terminal, and $\Delta P_{BS}$ indicates an active power control range of the base station. In FIG. 17, in the active power control range, the sum between the transmission power from the terminal to the base station and the reception power of the terminal from the base station is controlled to be maintained at a value of −75 dBm, similar to the case of FIG. 2.

As shown in FIG. 17, the active power control ranges $\Delta P_{MS}$ and $\Delta P_{BS}$ are more narrow that those in the related art, which results in improving power utilization efficiency of the terminals.

The base station transmitting and receiving antennas 100 and 200 and the base station using them according to the exemplary embodiments of the present invention that have been described above can minimize the active power control function and use the passive power control method to increase a channel capacity in a cell, and ensure the QoS in all terminals.

Since the battery utilization time of the terminals increases and a cell coverage area (cell radius) is extended, the number of base stations and repeaters can be reduced, thereby reducing costs of a system facility. Further, since a passive intermodulation distortion problem can be resolved and a common base station that can simultaneously provide two or more different services can be installed, it is possible to reduce installation and operation costs of a base station system.

The exemplary embodiments of the present invention that have been described above may be implemented by not only a method and an apparatus but also a program capable of realizing a function corresponding to the structure according to the exemplary embodiments of the present invention and a recording medium having the program recorded therein. It can be understood by those skilled in the art that the implementation can be easily made from the above-described exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A control method of a base station transmitting antenna that controls the operation of a transmitting antenna in a base station, the control method comprising:
    collecting positional information and transmission level values of all terminals in a cell;
    analyzing statistics of cell traffic using the positional information and transmission level values, and generating antenna radiation patterns on the basis of the analyzed statistics result;
    optimizing the antenna radiation patterns by synthesizing beam patterns; and
    changing antenna beam patterns according to the optimized antenna radiation patterns.

2. The control method of claim 1, wherein the antenna radiation patterns are beam patterns with respect to an elevation angle direction.

3. The control method of claim 1, wherein the antenna radiation patterns are synthesized beam patterns with respect to an elevation angle direction and an azimuth angle direction.

4. The control method of claim 1, wherein the beam pattern synthesis is performed using a genetic algorithm.

5. The control method of claim 1, wherein the changing of the antenna beam patterns comprises:
    determining whether a channel capacity in a service cell increases on the basis of the optimized antenna radiation patterns, and, when it is determined that the channel capacity increases, determining whether a QoS is ensured in terminals in the service cell; and
    when it is determined that the QoS is ensured, changing the antenna beam patterns.

6. The control method of claim 5, wherein the changing of the antenna beam patterns further comprises repeating the collecting of the positional information and transmission level values of all of the terminals, the generating of the antenna radiation patterns, the optimizing of the antenna radiation patterns, and the determining of whether the channel capacity increases and whether the QoS is ensured, if the channel capacity does not increase or the QoS is not ensured.

7. The control method of claim 5, wherein the determining of whether the channel capacity increases and whether the QoS is ensured comprises:
    generating the optimized antenna radiation patterns; and
    determining whether the channel capacity increases using the generated antenna radiation patterns.

8. The control method of claim 1, wherein the optimizing of the antenna radiation patterns comprises extracting aperture vector information to control an aperture vector.

* * * * *